United States Patent
Xue et al.

(10) Patent No.: US 7,807,977 B2
(45) Date of Patent: Oct. 5, 2010

(54) SYSTEMS, METHODS AND APPARATUS FOR ROW-CORRELATED NOISE MONITORING IN DIGITAL X-RAY SYSTEMS

(75) Inventors: Ping Xue, Cottage Grove, WI (US); James Zhengshe Liu, Glenview, IL (US); Chuande Liu, Waukesha, WI (US); Scott William Petrick, Sussex, WI (US); Kenneth Scott Kump, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/755,229

(22) Filed: May 30, 2007

(65) Prior Publication Data

US 2008/0296507 A1 Dec. 4, 2008

(51) Int. Cl.
*G01T 1/24* (2006.01)

(52) U.S. Cl. .................................................. 250/371
(58) Field of Classification Search .................. 250/371

See application file for complete search history.

(56) References Cited

U.S. PATENT DOCUMENTS

| 6,697,663 | B1 * | 2/2004 | Lin | 600/425 |
| 7,218,705 | B2 * | 5/2007 | Xue et al. | 378/98.8 |
| 2006/0239415 | A1 * | 10/2006 | Liu et al. | 378/207 |

* cited by examiner

*Primary Examiner*—Constantine Hannaher
(74) *Attorney, Agent, or Firm*—Peter Vogel, Esq.; William Baxter, Esq.; Michael G. Smith, Esq.

(57) ABSTRACT

Systems, methods and apparatus are provided through which in some embodiments, row-correlated noise of a digital X-ray detector is monitored during idle operation of the digital X-ray detector and the magnitude of the row-correlated noise is compared to a visible threshold.

29 Claims, 8 Drawing Sheets

SYSTEMS, METHODS AND APPARATUS FOR ROW-CORRELATED NOISE MONITORING IN DIGITAL X-RAY SYSTEMS

FIELD OF THE INVENTION

This invention relates generally to medical diagnostic imaging systems, and more particularly to identifying image artifacts induced by row-correlated noise in medical imaging systems employing solid state detectors.

BACKGROUND OF THE INVENTION

The panel of a digital X-ray detector is scanned row by row. Each row includes pixels that are read out at the same time. Any time-varying interference that affects the pixels is row correlated noise (RCN) in an image generated by the X-ray detector. The time-varying interference can result from electromagnetic interference (EMI), mechanical vibration, and/or power supply noise.

More specifically, RCN is an offset-type of noise that is independent of X-ray signal. RCN can be directly calculated from offset or dark images. RCN can be calculated by generating a row average vector of the offset difference image that is created by subtracting two sequential offset images and then calculating the standard deviation of the vector. Since the visibility of image artifact is related to the background noise, an RCN index is defined as the ratio of RCN artifact to the standard deviation of the difference image. The RCN is a measured, empirical quantification of the RCN of a digital image detector at a particular point in time. The RCN index can be calculated as follows:

$$\text{RCN\_index} = \frac{\sigma_{RCN}}{\sigma_{background}} - \frac{1}{\sqrt{\text{number\_columns}}} \quad \text{Equation 1}$$

where $\sigma_{RCN}$ indicates RCN artifacts while the $\sigma_{background}$ is the standard deviation of the whole offset difference image representing the background noise. The term 1/sqrt (number_columns) is further subtracted to yield an unbiased estimate of the RCN index. In addition to the whole image, the RCN index can also be calculated based on region of interest (ROI) on the image. To have robust estimate or to capture potential and maximum value of the RCN Index, a sequence of offsets can also be used. For example, in digital mammography and RAD systems, an RCN test has been introduced during system boot or in system diagnosis or in a routinely system quality check.

The RCN artifact is easy to see in low dose X-ray images. With the increasing X-ray dose, the impact of RCN gradually decreases until the ratio is below the visible threshold. However, the current RCN index value is calculated based on offset images without X-ray and compared to a constant threshold.

There are at least two conventional methods to ameliorate the effects of RCN: One conventional method of ameliorating RCN in a digital image detector is to design the detector that is less susceptible to the interference. For instance, the digital image detector can be designed with a greater EMI shield to protect from EMI and more rugged parts to protect from mechanical vibration. The measures, however, will increase weight of the digital image detector which is counterproductive to the increasing customer interest in lighter digital image detectors. These measures to ameliorate RCN also increase attenuation of the X-ray radiation to the extent that more X-ray radiation is required to achieve the same image quality, which is counterproductive to patient safety and counterproductive to the increasing customer interest in lower doses of X-ray radiation.

Another conventional method of reducing the effect of RCN is to avoid physical placement of the X-ray system in an environment with high EMI. One way to avoid physical placement of the X-ray system in a high EMI environment is to provide an environmental specification to the customer during system installation that would prevent placement of the X-ray system in a location that has high amounts of EMI. Another way to avoid physical placement of the X-ray system in a high EMI environment requires installation in a room that is specially equipped to shield EMI. However, more and more X-ray systems are designed for mobile environments; most locations for mobile digital X-ray systems are anywhere in the hospital in locations outside of specially equipped rooms. In that case, reducing the effect of RCN is particularly important to ensure image quality.

For the reasons stated above, and for other reasons stated below which will become apparent to those skilled in the art upon reading and understanding the present specification, there is a need in the art to reduce the effects of RCN without adding shielding, increasing component strength or requiring placement of the X-ray system in specially equipped rooms.

BRIEF DESCRIPTION OF THE INVENTION

The above-mentioned shortcomings, disadvantages and problems are addressed herein, which will be understood by reading and studying the following specification.

In one aspect, row-correlated noise generated by a digital X-ray detector is monitored during an idle state of the digital X-ray detector and determination is made whether or not the magnitude of the row-correlated noise is above a threshold.

In another aspect, the threshold is associated with an acquisition technique of the digital X-ray detector.

In yet another aspect, the magnitude of row-correlated noise is monitored during a scrub operation of the digital X-ray detector for battery-powered portable detectors).

In still another aspect, the magnitude of row-correlated noise is monitored immediately previous to an image acquisition operation of the digital X-ray detector.

In a further aspect, the magnitude of row-correlated noise is monitored at ½ minute or 1 minute intervals or at system power-initialization.

In yet a further aspect, artifacts in an image are monitored by averaging pixel values in each row of a digital X-ray detector; determining contrast from amplitude and estimating electromagnetic interference from measurement data.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into four sections. In the first section, a system level overview is described. In the second section, embodiments of methods are described. In the third section, particular implementations are described. Finally, in the fourth section, a conclusion of the detailed description is provided.

System Level Overview

Figure 1:
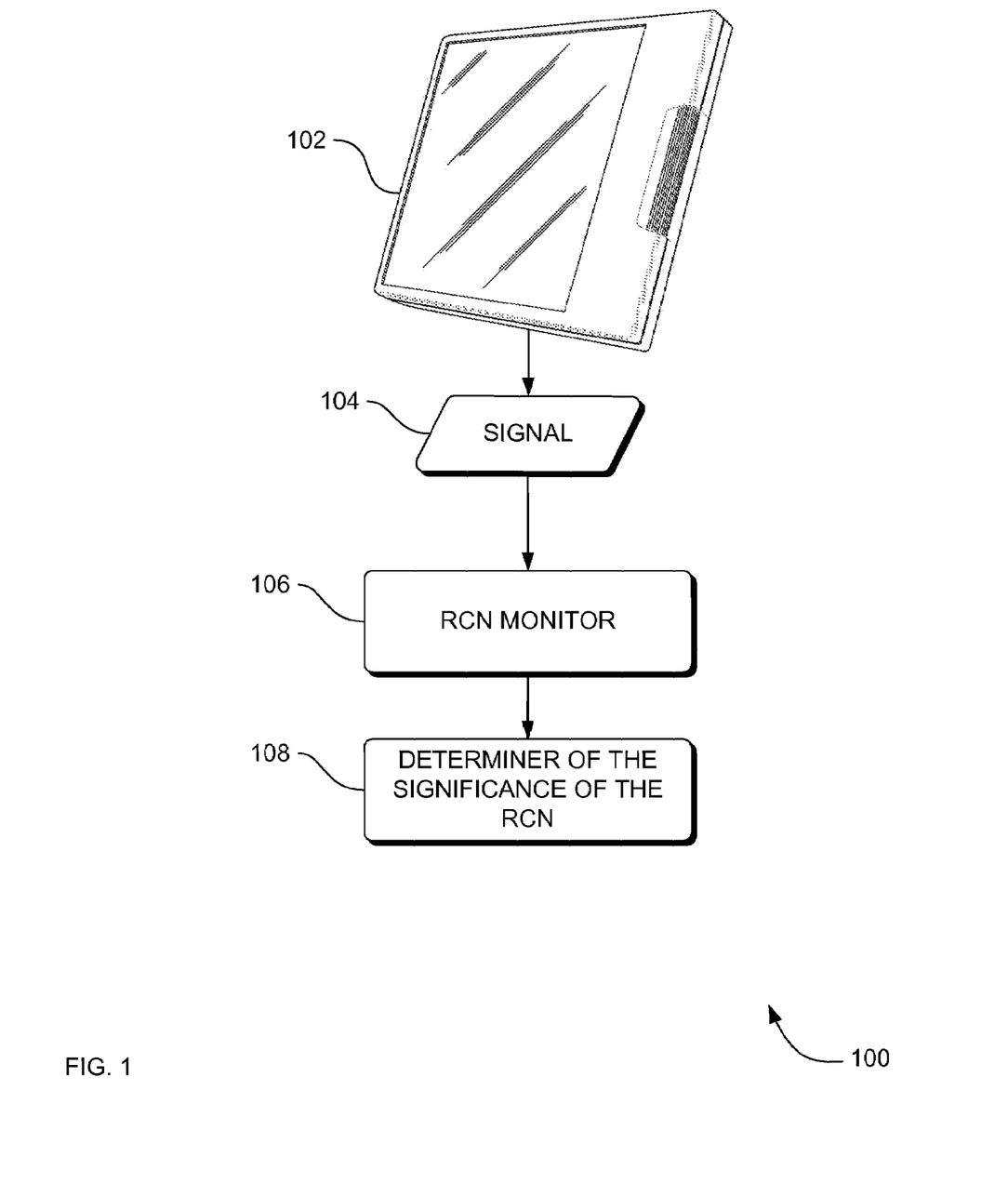
FIG. 1 is a block diagram of an overview of a system to monitor artifacts in an image.

FIG. 1 is a block diagram of an overview of a system 100 to monitor artifacts in an image. System 100 solves the need in the art to monitor the effects of row-correlated noise.

System 100 includes a digital X-ray detector 102. The digital X-ray detector 102 includes a conventional panel of semiconductor FETs and photodiodes. The digital X-ray detector 102 generates a signal that includes row-correlated noise (RCN) 104. The signal having RCN 104 is transmitted to an RCN monitor 106. The RCN monitor 106 is described in greater detail in action 202 in FIG. 2 below. The RCN monitor 106 is operably coupled to a determiner 108 of the significance of the RCN. The determiner 108 provides a ready basis to identify RCN in the signal 104 from the digital X-ray detector 102, thereby providing an opportunity to reduce noise in the images read by the digital X-ray detector 102 that is presented in the images as artifacts.

While the system 100 is not limited to any particular digital X-ray detector 102, signal 104, RCN monitor 106, and determiner 108 of the significance of the RCN, but for sake of clarity a simplified digital X-ray detector 102, signal 104, RCN monitor 106 and determiner 108 of the significance of the RCN are described. While system 100 shows the RCN monitor 106 and the determiner 108 located outside the digital X-ray detector 102, system 100 is not necessarily limited according to that particular embodiment. In other embodiments, the RCN monitor 106 and the determiner 108 are located within the digital X-ray detector 102.

The system level overview of the operation of an embodiment is described above in this section of the detailed description. Some embodiments operate in a multi-processing, multi-threaded operating environment on a computer.

Method Embodiments

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200-700 are performed by a program executing on, or performed by firmware or hardware that is a part of, a computer.

Figure 2:
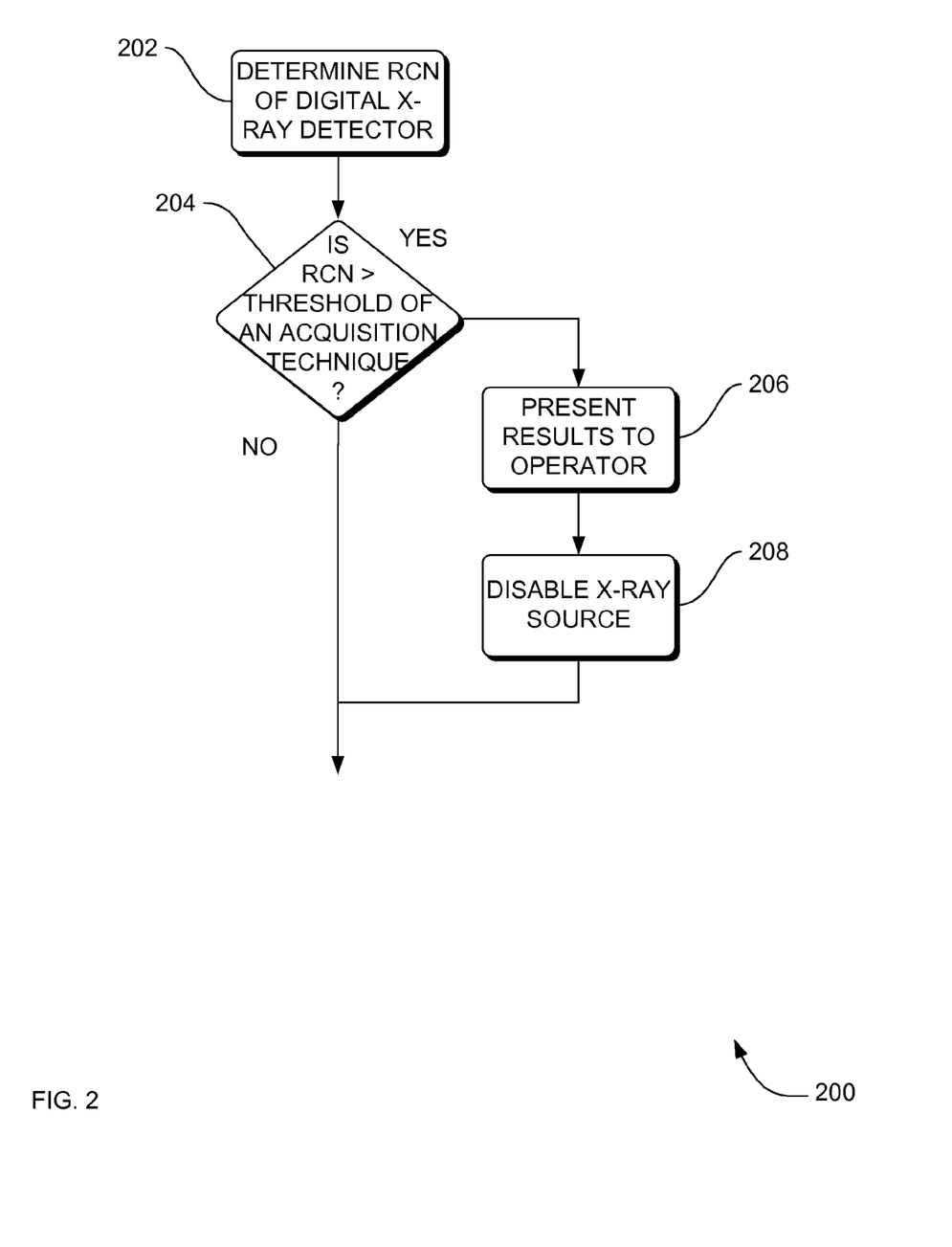
FIG. 2 is a flowchart of a method to monitor row-correlated noise in a digital X-ray detector, according to an embodiment.

FIG. 2 is a flowchart of a method 200 to monitor row-correlated noise in a digital X-ray detector, according to an embodiment. Method 200 solves the need in the art to monitor artifacts in an image produced by the digital X-ray detector 102.

Method 200 includes monitoring 202 or determining a magnitude of row-correlated noise (RCN) generated by the digital X-ray detector (e.g. digital X-ray detector 102 in FIG. 1) during a state of low operation of the digital X-ray detector. The low state of operation is discussed in greater detail in FIG. 4 and FIG. 5 below. Monitoring 202 during a low state of operation provides a means of evaluating the extent of RCN other than when important operational demands, such as image acquisition, are being made of the digital X-ray detector. The monitoring 202 is one embodiment of the function performed by RCN monitor 102 in FIG. 1 above.

Method 200 also includes determining 204 whether or not the magnitude of the row-correlated noise is above or exceeds a threshold. In some embodiments, the determining 204 includes setting a flag in memory in accordance with the determining 204 so that the results of the determining are available to other components. The determining 204 is one embodiment of the function performed by the determiner 108 in FIG. 1.

In some embodiment of determining 204 whether or not the magnitude of the RCN is above or exceeds a threshold, the RCN index is estimated using Equation 1 above and is compared to threshold, $T_{RCN\_Index}$, as shown in Equation 2.

$$\frac{\sigma_{RCN}}{\sigma_{background}} - \frac{1}{\sqrt{\text{number\_columns}}} \leq \text{or} > T_{RCN\_index} \quad \text{Equation 2}$$

where $T_{RCN\_index}$ is a threshold of detectability for artifact to noise ratio. To consider the effect of RCN on an X-ray image, the background noise shall be estimated based on the actual X-ray image. This noise is a combination of detector electronic noise, $\sigma_{electronic\_noise}$, and X-ray photon noise, $\sigma_{X-ray}$, converted to digital data in count. The X-ray photon noise is proportional to the square root of X-ray dose, $X_{dose}$, that the detector receives. As a result, $$\sigma_{background} = \sqrt{\sigma_{electronic\_noise}^2 + \sigma_{x-ray}^2} = \sqrt{\sigma_{electronic\_noise}^2 + k \times X_{dose}} \quad \text{Equation 3}$$

where k is a noise conversion factor associated to X-ray spectrum and detector characteristics. The value k can be predetermined based on detector type and system acquisition protocols associated to applications and stored in the system.

$X_{dose}$ can be estimated based on existing auto-exposure control (AEC) settings on the system or auto-optimization parameters (AOP) results before regular X-ray exposures, as also described in FIG. 6 below.

Some embodiments of method 200 also include presenting 206 to an operator of the digital X-ray detector information or an indication that the row-correlated noise is above the threshold. Some embodiments of the indication include a warning message.

Based on Equations 1 and 3 with different $T_{RCN\_index}$ settings, the followings cases can be implemented:

Case 1: when RCN_Index<=$T1_{RCN\_index}$, the warning message indicates that the digital X-ray detector is ready for X-ray operation.

Case 2: when $T1_{RCN\_index}$<RCN_Index<=$T2_{RCN\_index}$, the warning message indicates that the digital X-ray detector image quality may be adversely affected by interference is presented to the operator before an X-ray exposure is made.

Case 3: when RCN_Index>$T2_{RCN\_index}$, the warning message indicates that the digital X-ray detector is prevented or disable from operation.

The warning message can be visual such as a pop-up display on the system control console or a flashing LED. The warning message can also be a sound. The color of the warning message or the volume of the sound can be designed to reflect the degree of the possible image artifact.

Some embodiments of method 200 also include disabling 208 operation of an X-ray source that is associated with the digital X-ray detector, as in case 3 above. In the instances where the X-ray source is disabled 208, unnecessary and unproductive emission of X-ray radiation is prevented under the circumstances where a proper image will not be formed at the digital X-ray detector as a result of excessive RCN in the digital X-ray detector 102. In other embodiments, the digital X-ray detector is instructed to enter a "sleep" state or a state of suspension.

In some embodiments, the threshold is associated with an acquisition technique of the digital X-ray detector 102. More specifically, the threshold is selected in reference to an acquisition technique because some acquisition techniques have different thresholds above which the RCN is unacceptable. FIG. 6 below illustrates one embodiment of a method of setting, selecting or determining the threshold in reference to an acquisition technique of the digital X-ray detector.

Figure 3:
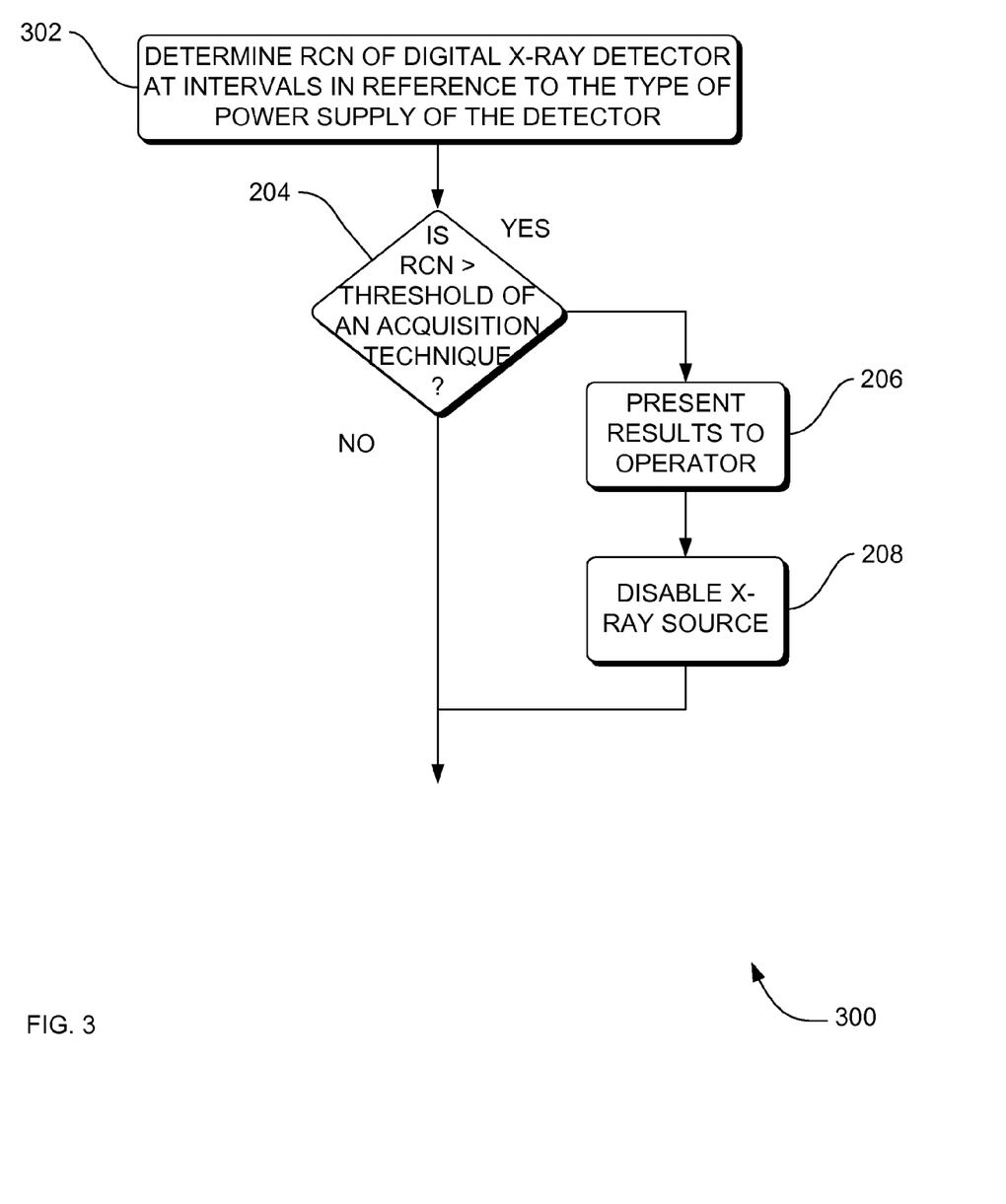
FIG. 3 is a flowchart of a method to monitor row-correlated noise in a digital X-ray detector, according to an embodiment;
}

FIG. 3 is a flowchart of a method 300 to monitor row-correlated noise in a digital X-ray detector, according to an embodiment. Method 300 prevents clinical imaging with RCN artifacts produced by the digital X-ray detector 102.

Method 300 includes monitoring 302 or determining a magnitude of row-correlated noise generated by a digital X-ray detector during at least one point in time. The point in time that the monitoring/determining 302 is performed is selected in reference to the type of power supply of the digital X-ray detector. One embodiment of the selection of the point in time is described is greater detail in FIG. 4 below.

Some embodiments of method 300 also includes determining 204 whether or not the magnitude of the row-correlated noise exceeds the threshold, presenting 206 the indication that the row-correlated noise is above the threshold, and disabling 208 operation of the X-ray source.

Figure 4:
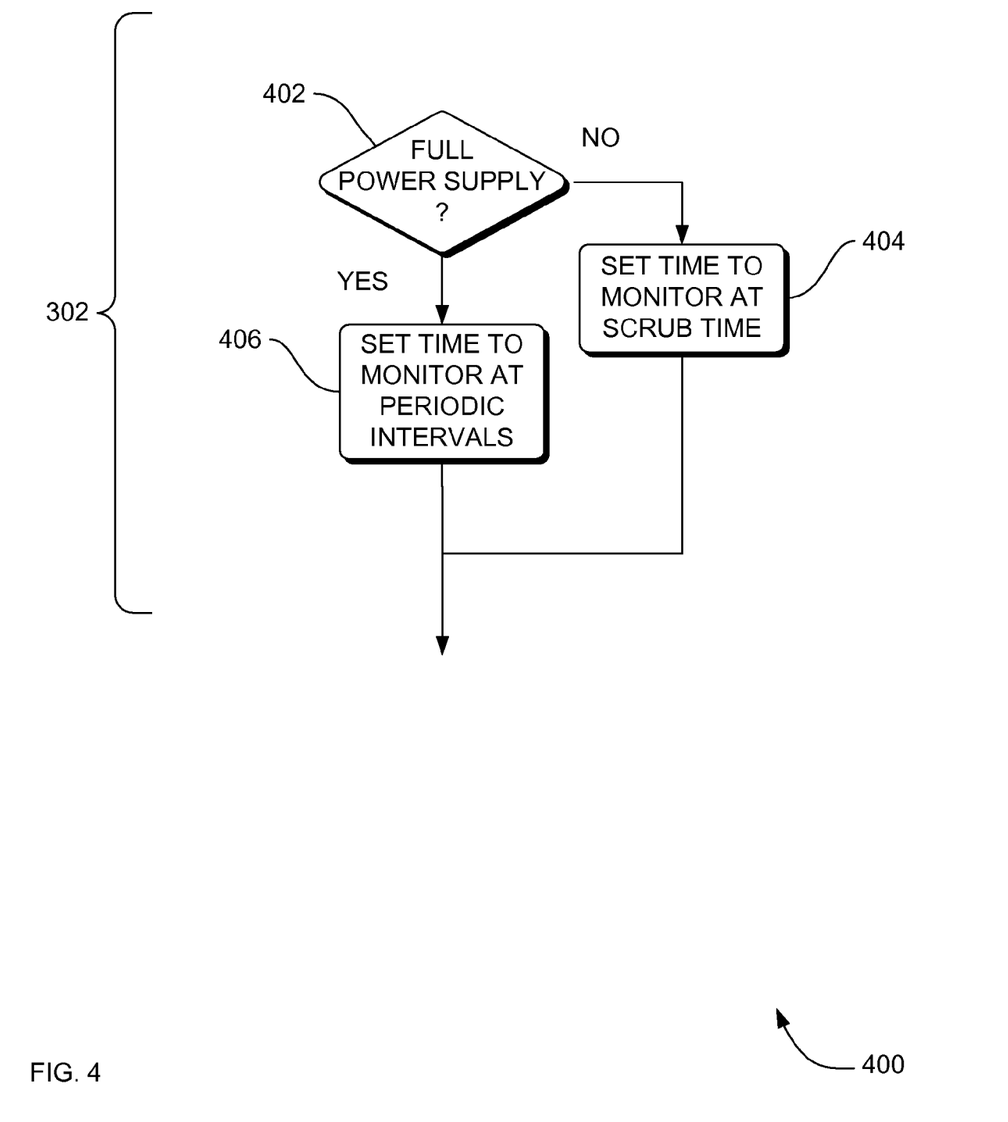
FIG. 4 is a flowchart of a method of selecting of the point(s) in time at which the magnitude of row-correlated noise generated by a digital X-ray detector is monitored, according to an embodiment.

FIG. 4 is a flowchart of a method 400 of selecting of the point(s) in time at which the magnitude of row-correlated noise generated by a digital X-ray detector is monitored, according to an embodiment. Method 400 is one embodiment of selecting the point(s) in time at which the magnitude of row-correlated noise generated by a digital X-ray detector is monitored.

In situations where the digital X-ray detector does not have a full power continuously applied 402, such as when the digital X-ray detector is powered by a battery, the point of time at which the magnitude of row-correlated noise is monitored is set 404 to a scrub operation of the digital X-ray detector. The scrub operation being performed immediately prior to an image acquisition operation of the digital X-ray detector having a battery-power source. In that case, the RCN is monitored or sampled on a limited basis, during the scrub operation, in order to limit the amount of additional power that is drained from the battery power supply of the digital X-ray detector. The scrub operation is one example of an idle state of the digital X-ray detector. The idle state is referred to as detector framing node (DFN) normal mode and is the default state of operation of the digital X-ray detector. More generally, during idle state, the digital X-ray detector is waiting for an event to occur, such as receipt of an instruction to read the rows of the panel of the digital X-ray detector.

In situations where the digital X-ray detector has full power continuously applied (e.g. from a power supply obtaining power from a 120 volt alternating current conventional wall outlet power source), the point of time at which the magnitude of row-correlated noise is monitored is set 406 to power initialization or set to intervals or periods in a range of between ½ minute and 1 minute during the idle state of the digital X-ray detector. In that case, the RCN is monitored or sampled on a regular basis because of the lack of limitations on the amount of power that is available to the digital X-ray detector.

In some embodiments, after a detector is powered up, the panel is directed to scan, or scrub, periodically. However, scrub data without X-ray signal is generally discarded and not used by the system for offset or gain correction of the X-Ray image. Since RCN is not related to X-ray signal, RCN can be directly computed from the scrub data. A first scrub image is stored in the detector or system. When data from a 1st scan line in a 2nd scrub image arrives, a simple line average can be calculated. Then, iterative standard deviations are computed based on the average line results. This process is continued until the 2nd scrub image is collected. At that stage, the RCN, $\sigma_{RCN}$ is estimated and compared to a predefined threshold. The scrub image 2 can replace scrub image 1 and the calculation can be performed iteratively. The calculation results can be sent to the system and stored in an event log for monitoring purpose or sent with an X-ray image acquisition.

The RCN index calculation can also be applied to an ROI instead of the whole image to accelerate the calculation.

Figure 5:
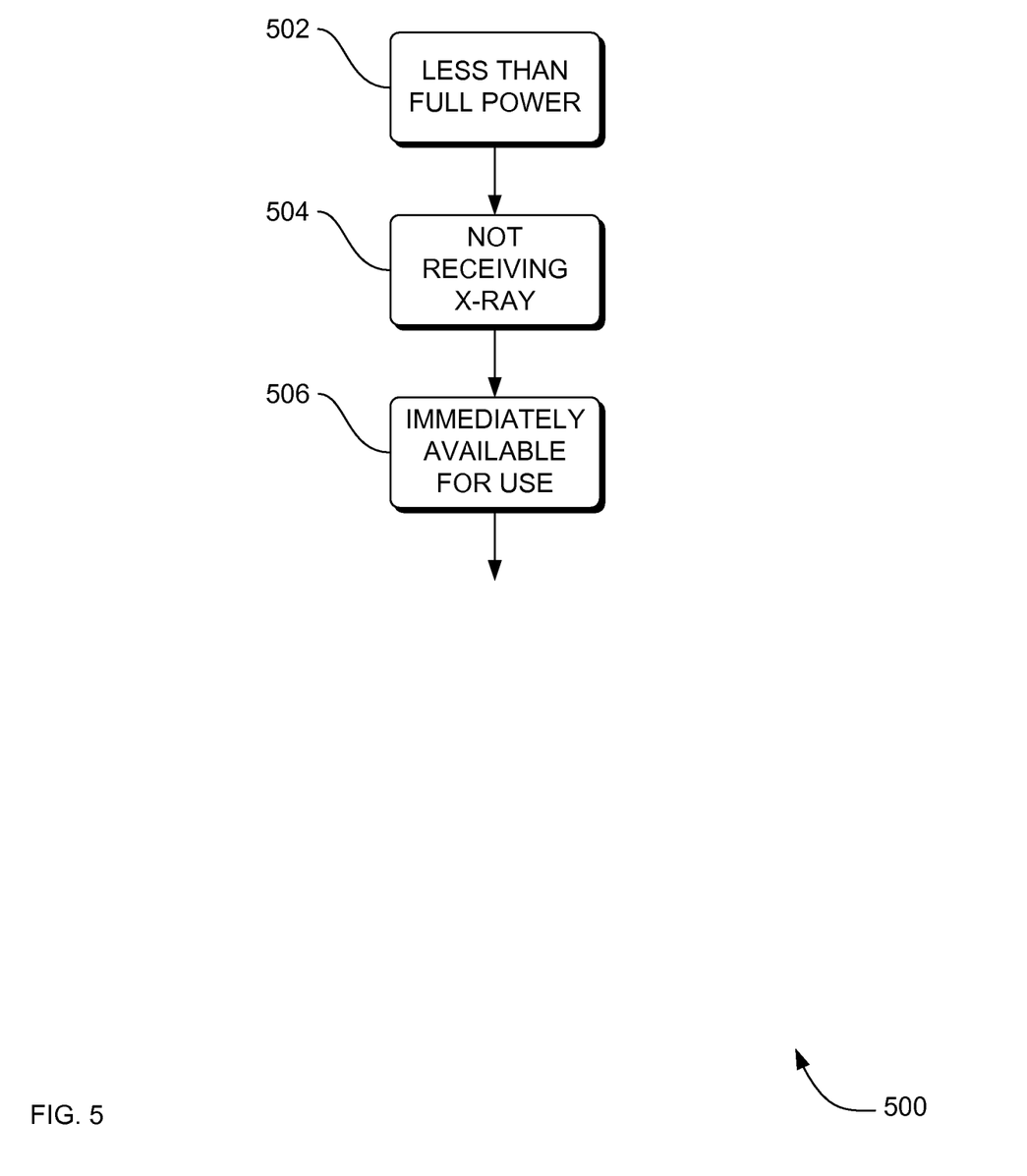
FIG. 5 is a flowchart of a method of determining when the digital X-ray detector is in the idle state of operation that is suitable for RCN monitoring, according to an embodiment.

FIG. 5 is a flowchart of a method 500 of determining when the digital X-ray detector is in the idle state of operation that is suitable for RCN monitoring, according to an embodiment. In some embodiments of method 500, the idle state of the digital X-ray detector is indicated when the digital X-ray detector is consuming 502 electrical power at less than a full-power level. In some embodiments of method 500, idle state of the digital X-ray detector is indicated when the digital X-ray detector is not receiving 504 X-ray radiation from a manufactured X-ray source. In some embodiments of method 500, the idle state of the digital X-ray detector is indicated when the digital X-ray detector is immediately available 506 for use, such when the digital X-ray detector is not acquiring an image.

Figure 6:
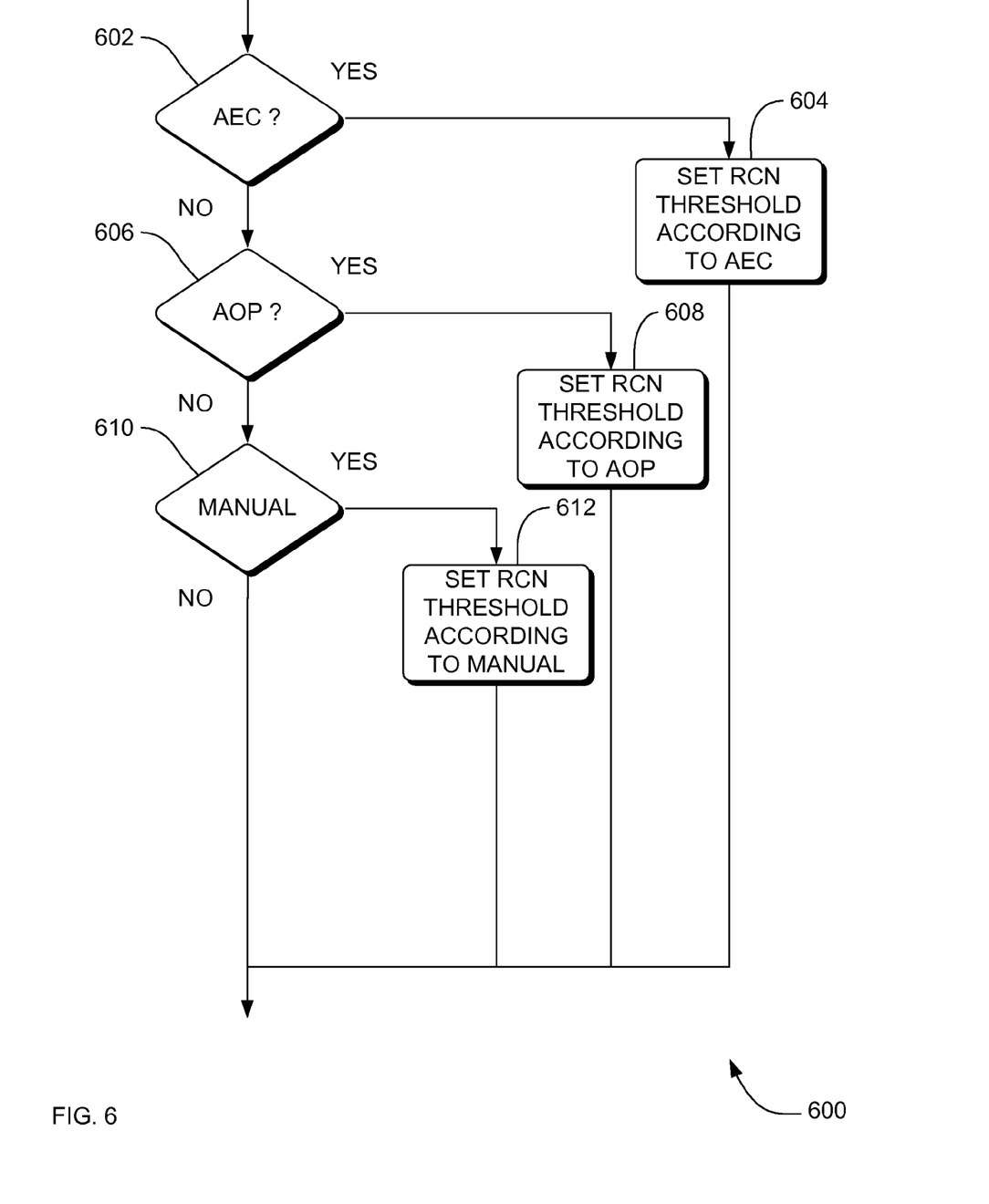
FIG. 6 is a flowchart of a method to set the RCN threshold in reference to an acquisition technique of the digital X-ray detector, according to an embodiment.

FIG. 6 is a flowchart of a method 600 to set the RCN threshold in reference to an acquisition technique of the digital X-ray detector, according to an embodiment.

Some X-ray acquisition techniques have different thresholds above which the RCN is unacceptable. In some embodiments of the systems, methods and apparatus described herein, the threshold is associated with an acquisition technique of the digital X-ray detector 102. More specifically, the threshold is selected in reference to an acquisition technique. Method 600 illustrates one embodiment of a method of setting, selecting or determining the threshold in reference to an acquisition technique of the digital X-ray detector.

For example, when the acquisition technique is auto-exposure control (AEC) 602, the threshold of acceptable RCN is set 604 to a level above which artifacts created by the RCN prevent accurate diagnosis of anatomical structures in the image. In some embodiments the AEC threshold is set to 400 MR film speed.

In some embodiments, the threshold of acceptable RCN is determined and set by first acquiring one (singular) low-dose image of the patient, the patient thickness and acquisition technique are calculated from the low-dose image, from which an amount of X-ray strength is calculated for a normal X-ray image. Then the RCN threshold and acquisition technique are determined. For example, when the acquisition technique is auto-optimization parameters (AOP) 606, the threshold of acceptable RCN is set 608 to a level above which artifacts created by the RCN prevent accurate diagnosis of anatomical structures in the image. The AOP threshold depends upon the acquisition technique, such as RAD at 400 MR speed.

For example, when the acquisition technique is manual for mammo and non-mammo radiological imaging (RAD) 610, wherein the threshold of acceptable RCN is set 612 to a level above which artifacts created by the RCN prevent accurate diagnosis of non-cardiological, non-mammalogical and mammo anatomical structures in the image. One embodiment of the threshold of RCN is 30%. One embodiment of the threshold of RCN is between 10% to 20%.

Figure 7:
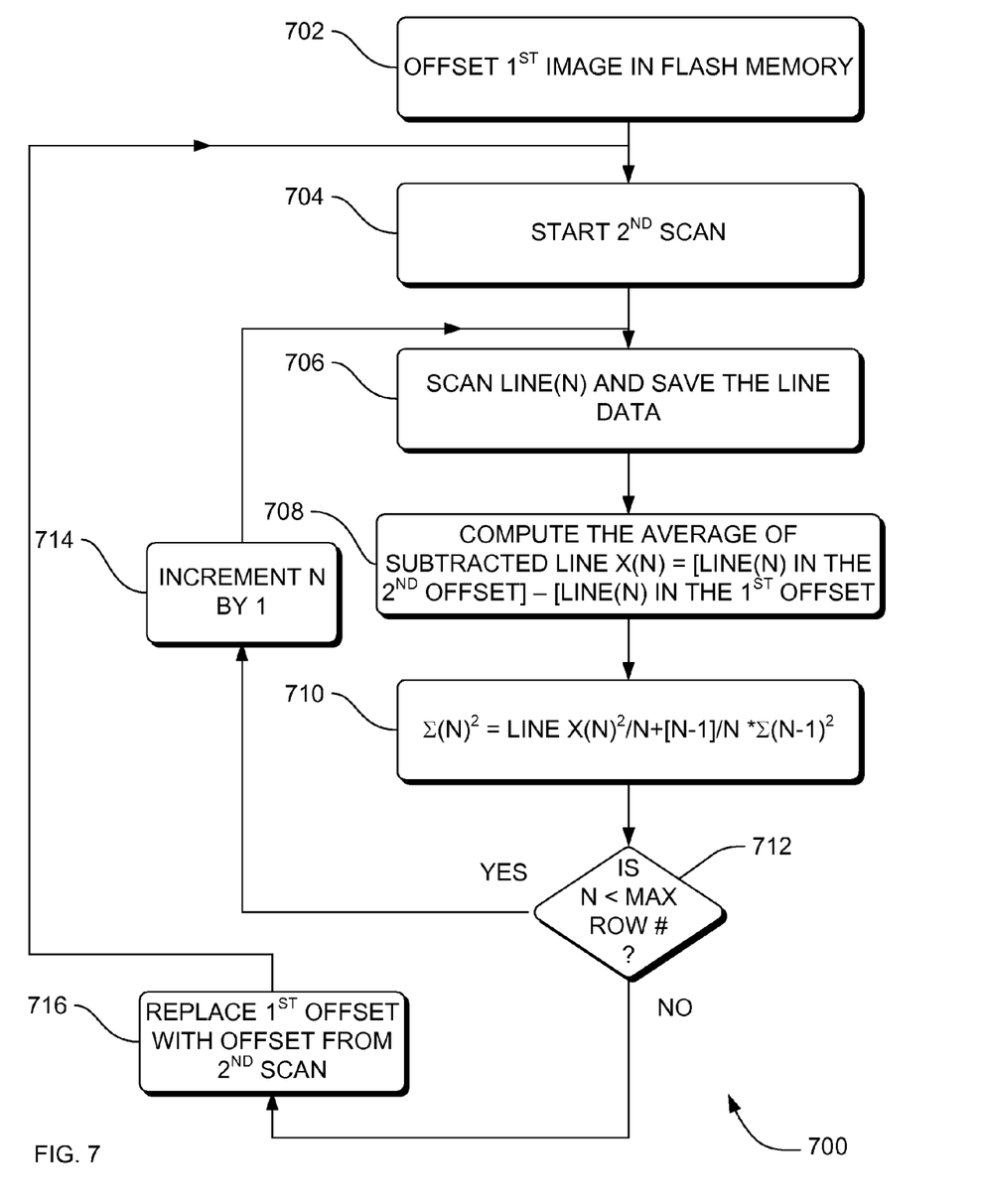
FIG. 7 is a flowchart of a method to monitor RCN in real-time, according to an embodiment.

FIG. 7 is a flowchart of a method 700 to monitor RCN in real-time, according to an embodiment. Method 700 includes storing 702 a first scrub image that is acquired in flash memory as offset 1. Method 700 also includes acquiring 704 second image. Some embodiments of method 700 also include scanning 706 the nth line (row) and saving the line data. Some embodiments of method 700 also include determining or computing 708 the average value of a subtracted line n as the nth line in the second image minus the nth line in the first image. Some embodiments of method 700 also includes determining 710 that the square of the Sigma of the nth line is equal to the square of the nth line, divided by 2, plus n−1 divided by n, multiplied by the square of Sigma of n minus 1.

At action 712, if n is less than the maximum row number, then n is incremented 714 by one, and the method 700 continues at action 706 above. If n is not less than the maximum number of rows at action 712, then the first offset is replaced 716 with the offset from the second scan, and the method 700 continues at action 704 above. Method 700 includes the assumption that the mean of average lines of subtracted images is zero.

Figure 8:
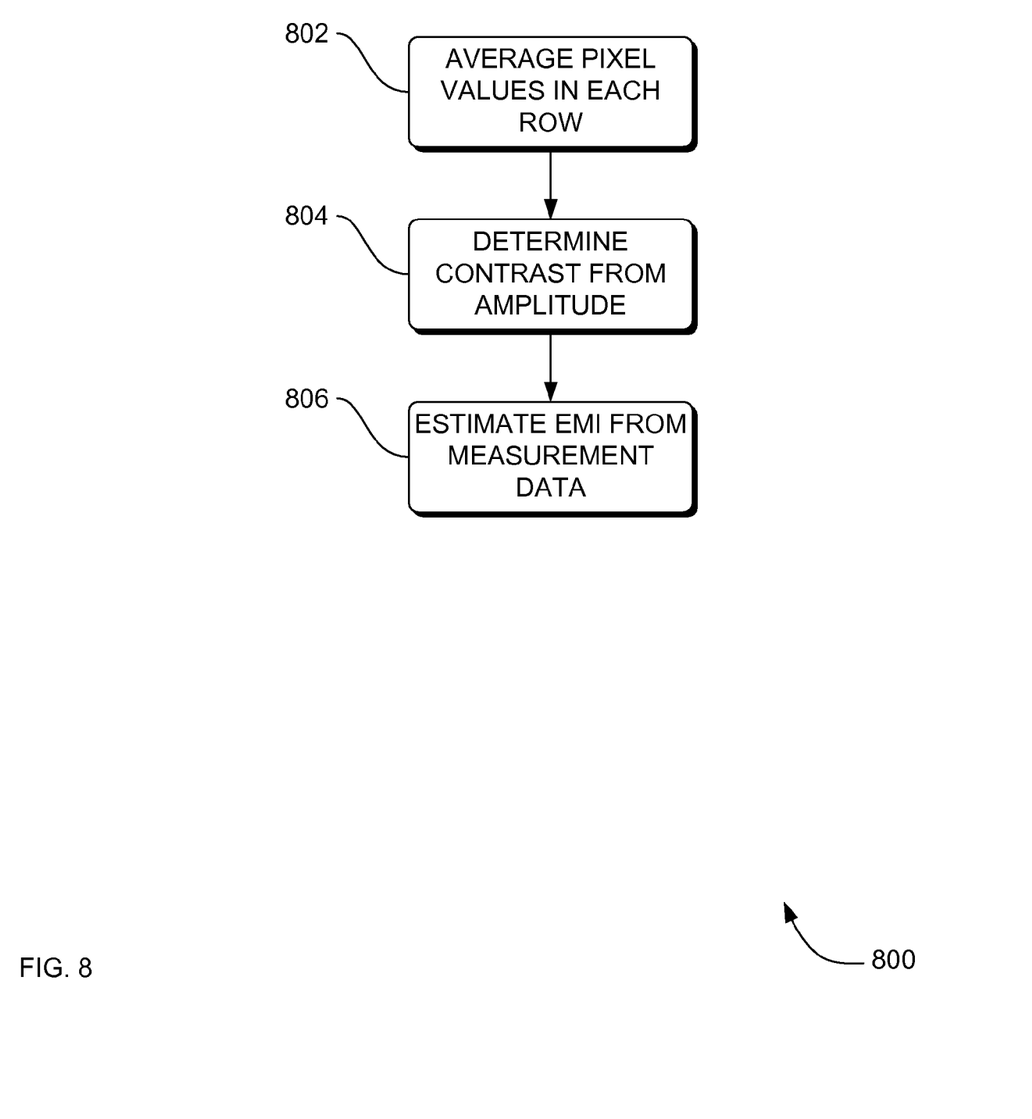
FIG. 8 is a flowchart of a method to analyze artifacts in an image, according to an embodiment.

FIG. 8 is a flowchart of a method 800 to analyze artifacts in an image, according to an embodiment. In method 800, the electromagnetic interference (EMI) can be described as a sinusoidal signal in time domain. Since all the pixels on each row of the image acquired at the same time instance, the pixels are affected by the EMI in a simultaneous fashion. If the amplitude and phase of the EMI is the same across the entire detector as in most conventional clinical images, all pixels on a row of the image will be affected similarly.

Accordingly, the artifact due to the EMI can be obtained by averaging 8×02 pixel values in each row of the image to reduce the random additive noise introduced by the measurement system. When EMI strength varies across the detector, the averaging operation cannot be performed over the whole row. In that case, the image should be divided into ROIs (regions of interest) and the averaging is then performed with each of the ROIs.

Some embodiments of method 800 also include determining 804 the contrast of the artifact in the image from the amplitude of the sinusoid. Because the artifact is a sinusoidal signal, let $f_{EMI}$ and $a_{EMI}$ be, respectively, the frequency and amplitude of the sinusoid. The artifact can be described by the following:

$$y(n) = a_{EMI} e^{j2\pi f_{EMI} n} + e(n)$$

Where e(n) is the measurement system noise after averaging.

To estimate 806 $a_{EMI}$ from measurement data sequence $\{y(0), y(1), \ldots, y(N-1)\}$ with N being the number of scanning lines:

$$Y = [y(0) y(1) \ldots y(N-1)]^T$$

and $$\phi_{EMI} = [1\, e^{j2\pi f_{EMI}} \ldots e^{j2\pi f_{EMI}(N-1)}]^T$$

Where $(\bullet)^T$ denotes transpose. The estimates are obtained $\{\hat{a}_{EMI}, \hat{f}_{EMI}\}$ of $\{a_{EMI}, f_{EMI}\}$ by minimizing the following nonlinear least squares (NLS) criterion:

$$C_1(a_{EMI}, f_{EMI}) = \|Y - a_{EMI}\phi_{EMI}\|^2 \qquad \text{Equation 4}$$

Where $\|\bullet\|$ denotes the Euclidean norm. When the noise e(n) is a zero-mean white Gaussian random process, the NLS estimates coincide with maximum likelihood (ML) estimates. When the noise is colored, however, the NLS estimates are no longer the ML estimates, but the NLS estimates can still have excellent statistical performance. Minimizing the cost function $C_1$ in Equation 4 with respect to $a_{EMI}$ yields the estimate of $a_{EMI}$:

$$\hat{a}_{EMI} = (\phi_{EMI}^H \phi_{EMI})^{-1} \phi_{EMI}^H Y = \phi_{EMI}^H Y/N \qquad \text{Equation 5}$$

Where $(\bullet)^H$ denotes the complex conjugate transpose. By combining Equation 2 into Equation 1, we have:

$$\|Y - \phi_{EMI}\phi_{EMI}^H Y/N\|^2 = (Y - \phi_{EMI}\phi_{EMI}^H Y/N)^H (Y - \phi_{EMI}\phi_{EMI}^H Y/N)$$
$$= Y^H Y - Y^H \phi_{EMI}\phi_{EMI}^H Y/N$$

Which is minimized by maximizing:

$$C_2(f_{EMI}) = (\phi_{EMI}^H Y)^H (\phi_{EMI}^H Y)/N$$

Hence $f_{EMI}$ can be determined by:

$$\hat{f}_{EMI} = \underset{f_{EMI}}{\arg\max} \{|\phi_{EMI}^H Y|^2 / N\} \qquad \text{Equation 6}$$

Once $\hat{f}_{EMI}$ is obtained, the amplitude $a_{EMI}$ is ready to be determined from Equation 2:

$$\hat{a}_{EMI} = \phi_{EMI}^H Y/N \big|_{f_{EMI} = \hat{f}_{EMI}} \qquad \text{Equation 7}$$

The term $$\phi_{EMI}^H Y = \sum_{n=0}^{N-1} y(n) e^{-j2\pi f_{EMI} \cdot n}$$

in both Equations 6 and 7 is the discrete Fourier transform of sequence [y(0), y(1), ..., y(N−1)] that can be calculated via FFT. Hence the amplitude of the sinusoid can be calculated from the highest peak of amplitude of the FFT divided by N.

The height of the peak indicates the amplitude of the sinusoid. When the EMI consists of multiple frequencies, the amplitudes can also be calculated in a similar way. When the peaks are well separated in the frequency domain, the height of each peak gives the amplitude of each of the frequencies. When two frequencies are too close to be separated in the frequency domain, the amplitude of the frequencies can be obtained iteratively by removing the obtained sinusoids from the data sequence

[y(0), y(1), ..., y(N−1)]

The approach described above can obtain the best estimate of the sinusoid amplitude that is not sensitive to electronic noise that is changing with panel temperature of the detector.

Method 800 can be used in many applications and embodiments. One embodiment is an EMI monitoring system where the frequency and amplitude of the sinusoids are calculated real-time during image acquisition and warning signals are sent to the operator in the presence of the EMI. Since the eyes of different people have different sensitivity to artifacts with different frequencies, the warning threshold shall also be frequency dependent.

A second embodiment is the adjustment of the exposure techniques including kvp, ma, mas, filtration etc. according to the frequency and amplitude of the interference to make the artifact in the X-ray image invisible or to eliminate the artifact in the X-ray image.

A third embodiment is warning of the operator to install shielding equipment such as a shielding shell over the detector once the artifact is above the threshold.

The approach can also be used to evaluate the performance of different anti-EMI design options.

The following description provides an overview of computer hardware and a suitable computing environment in conjunction with which some embodiments can be implemented. Embodiments are described in terms of a computer executing computer-executable instructions. However, some embodiments can be implemented entirely in computer hardware in which a computer-executable instructions are implemented in read-only memory. Some embodiments can also be implemented in client/server computing environments where remote devices that perform tasks are linked through a communications network. Program modules can be located in both local and remote memory storage devices in a distributed computing environment.

A computer includes a processor, commercially available from Intel, Motorola, Cyrix and others. A computer also includes random-access memory (RAM), read-only memory (ROM), one or more mass storage devices, and a system bus, that operatively couples various system components to the processing unit. The memory and mass storage devices are types of computer-accessible media. Mass storage devices are more specifically types of nonvolatile computer-accessible media and can include one or more hard disk drives, floppy disk drives, optical disk drives, and tape cartridge drives. The processor executes computer programs stored on a computer-accessible media.

A computer can be communicatively connected to the Internet via a communication device. Internet connectivity is well known within the art. In one embodiment, a communication device is a modem that responds to communication drivers to connect to the Internet via what is known in the art as a "dial-up connection." In another embodiment, a communication device is an Ethernet® or similar hardware network card connected to a local-area network (LAN) that itself is connected to the Internet via what is known in the art as a "direct connection" (e.g., T1 line, etc.).

A user enters commands and information into a computer through input devices such as a keyboard or a pointing device. The keyboard permits entry of textual information into computer, as known within the art, and embodiments are not limited to any particular type of keyboard. Pointing device permits the control of the screen pointer provided by a graphical user interface (GUI) of operating systems such as versions of Microsoft Windows®. Embodiments are not limited to any particular pointing device. Such pointing devices include mice, touch pads, trackballs, remote controls and point sticks. Other input devices (not shown) can include a microphone, joystick, game pad, satellite dish, scanner, or the like.

In some embodiments, a computer is operatively coupled to a display device. The display device is connected to the system bus. Display device permits the display of information, including computer, video and other information, for viewing by a user of a computer. Embodiments are not limited to any particular display device. Such display devices include cathode ray tube (CRT) displays (monitors), as well as flat panel displays such as liquid crystal displays (LCD's). In addition to a monitor, computers typically include other peripheral input/output devices such as printers (not shown). Speakers and provide audio output of signals. The speakers are also connected to the system bus.

A computer also includes an operating system (not shown) that is stored on a computer-accessible media, the RAM, the ROM, and/or the mass storage device, and is executed by the processor. Examples of operating systems include Microsoft Windows®, Apple MacOS®, Linux®, UNIX®. Examples are not limited to any particular operating system, however, and the construction and use of such operating systems are well known within the art.

Embodiments of a computer are not limited to any type of computer. In varying embodiments, a computer comprises a PC-compatible computer, a MacOS®-compatible computer, a Linux®-compatible computer, or a UNIX®-compatible computer. The construction and operation of such computers are well known within the art.

A computer can be operated using at least one operating system to provide a graphical user interface (GUI) including a user-controllable pointer. A computer can have at least one web browser application program executing within at least one operating system, to permit users of a computer to access an intranet, extranet or Internet world-wide-web pages as addressed by Universal Resource Locator (URL) addresses. Examples of browser application programs include Netscape Navigator® and Microsoft Internet Explorer®.

A computer can operate in a networked environment using logical connections to one or more remote computers. These logical connections are achieved by a communication device coupled to, or a part of, a computer. Embodiments are not limited to a particular type of communications device. The remote computer can be another computer, a server, a router, a network PC, a client, a peer device or other common network node. The logical connections include a local-area network (LAN) and a wide-area network (WAN). Such networking environments are commonplace in offices, enterprise-wide computer networks, intranets, extranets and the Internet.

When used in a LAN-networking environment, a computer and remote computer are connected to the local network through network interfaces or adapters, which is one type of communications device. Remote computer also includes a network device. When used in a conventional WAN-networking environment, a computer and remote computer communicate with a WAN through modems (not shown). The modem, which can be internal or external, is connected to the system bus. In a networked environment, program modules depicted relative to a computer, or portions thereof, can be stored in the remote computer.

A computer also includes at least one power supply. Each power supply can be a battery.

The systems, methods and apparatus described herein can be embodied as computer hardware circuitry or as a computer-readable program, or a combination of both. More specifically, in a computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer, or on at least as many computers as there are components.

CONCLUSION

A row correlated noise is described. A technical effect of the row correlated noise monitor is to disable or suspend operations of a digital X-ray detector when levels of row correlated noise are high enough to the extent that the digital X-ray detector provides unacceptably poor results.

The systems, methods and apparatus described herein present at least three main aspects: (1) RCN is monitored during system idle for those detectors being always in full power mode or during image acquisition right before shooting X-ray. (2) The threshold of RCN test is linked to acquisition techniques such as AEC speed, AOP settings, or protocols for RAD and Mammo applications. Different speed and application modes indicate the detector input dose. The higher the dose, the less the artifact is visible. (3) If the RCN test fails before or during image acquisition, a warning message is sent to inform the operator. The message can be displayed on the control console, indicated by sound, or flashing LED directly on a mobile detector. If a RCN test indicates significant artifact in an X-ray image, the X-ray can be further prevented to avoid extra patient dose for the image with no diagnostic value.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the conventional components, and new components can be added to correspond to future enhancements and physical devices used in embodiments that can be introduced without departing from the scope of embodiments described herein. One of skill in the art will readily recognize that embodiments are applicable to future communication devices, different file systems, and new data types.

The terminology used in this application is meant to include all medical imaging, database and communication environments and alternate technologies which provide the same functionality as described herein.

We claim:

1. A computer usable medium including a program to monitor artifacts in an image, the program comprising:
   computer program code that monitors a magnitude of row-correlated noise generated by a digital X-ray detector during an idle state of the digital X-ray detector; and
   computer program code that generates a determination in a memory of whether or not the magnitude of the row-correlated noise is above a threshold.

2. The computer usable medium of claim 1, wherein the idle state is one of:
   the digital X-ray detector is consuming electrical power at less than a full-power level;
   the digital X-ray detector is not receiving X-ray radiation from a manufactured X-ray source; and
   the digital X-ray detector is immediately available for use.

3. The computer usable medium of claim 1, wherein the idle state further comprises:
   during a scrub operation of the digital X-ray detector for battery-powered portable detectors.

4. The computer usable medium of claim 1, wherein the idle state further comprises:
   immediately prior to an image acquisition operation of the digital X-ray detector.

5. The computer usable medium of claim 1, wherein the idle state further comprises:
   an idle operation of the digital X-ray detector.

6. The computer usable medium of claim 1, wherein the idle state further comprises:
   at regular intervals during the idle state or at system power-initialization.

7. The computer usable medium of claim 1, wherein the threshold further comprises:
   a threshold associated with an acquisition technique of the digital X-ray detector.

8. The computer usable medium of claim 1, further comprising:
   computer program code that presents to an operator of the digital X-ray detector an indication that the row-correlated noise is above the threshold.

9. A computer usable medium including a program of real-time analysis of row-correlated noise, the program comprising:
   computer program code that monitors a magnitude of row-correlated noise generated by a digital X-ray detector during at least one point in time, wherein the point in time selected is selected in reference to the type of power supply of the digital X-ray detector; and
   computer program code that generates a determination in a memory of whether or not the magnitude of the row-correlated noise is above a threshold.

10. The computer usable medium including a program of claim 9, wherein the point in time that is selected in reference to the type of power supply of the digital X-ray detector further comprises:
    during a scrub operation of the digital X-ray detector immediately previous to an image acquisition operation of the digital X-ray detector of battery-power source; and at regular intervals during the idle state of the digital X-ray detector powered by 120 volt AC.

11. The computer usable medium including a program of claim 9, wherein the threshold further comprises:
a threshold associated with an acquisition technique of the digital X-ray detector.

12. The computer usable medium including a program of claim 9, further comprising:
computer program code that presents to an operator of the digital X-ray detector an indication that the row-correlated noise is above the threshold.

13. A computer usable medium including a program to analyze row-correlated noise from a digital X-ray detector, the program comprising:
computer program code that monitors a magnitude of row-correlated noise generated by the digital X-ray detector; and
computer program code that determines whether or not the magnitude of the row-correlated noise is above a threshold, wherein the threshold is associated with an acquisition technique of the digital X-ray detector.

14. The computer usable medium of claim 13, wherein the acquisition technique of the digital X-ray detector further comprises:
auto-exposure control.

15. The computer usable medium of claim 13, wherein the acquisition technique of the digital X-ray detector further comprises:
auto-optimization parameters.

16. The computer usable medium of claim 13, wherein the acquisition technique of the digital X-ray detector further comprises:
radiographic image acquisition.

17. The computer usable medium of claim 13, wherein the acquisition technique of the digital X-ray detector further comprises:
mammography image acquisition.

18. The computer usable medium of claim 13, wherein the computer program code that monitors further comprise computer program code that:
monitors a magnitude of row-correlated noise generated by a digital X-ray detector during an idle state of the digital X-ray detector.

19. The computer usable medium of claim 13, the medium further comprising computer program code that:
presents to an operator of the digital X-ray detector an indication that the row-correlated noise is above the threshold.

20. A computer usable medium including a program to analyze row-correlated noise from a digital X-ray detector, the program comprising:
computer program code that determines that a magnitude of row-correlated noise in the digital X-ray detector is above a threshold;
computer program code that sets a flag in memory in accordance with the determining; and
computer program code that presents an indication of the flag to an operator of the digital X-ray detector.

21. The computer usable medium of claim 20, wherein the computer program code that presents an indication of the flag to an operator of the digital X-ray detector further comprises:
computer program code that displays at an operator console an indication of excessive row-correlated noise being sensed by the digital X-ray detector.

22. The computer usable medium of claim 20, wherein the computer program code that presents an indication of the flag to an operator of the digital X-ray detector further comprises:
computer program code that displays on a display device of the digital X-ray detector an indication of excessive row-correlated noise being sensed by the digital X-ray detector.

23. The computer usable medium of claim 20, wherein the computer program code that presents an indication of the flag to an operator of the digital X-ray detector further comprises:
computer program code that generates a sound by a sound generator of the digital X-ray detector which is audible to the human ear as an indication of excessive row-correlated noise being sensed by the digital X-ray detector.

24. The computer usable medium of claim 20, the medium further comprising:
computer program code that disables operation of an X-ray source that is associated with the digital X-ray detector.

25. The computer usable medium of claim 20, the medium further comprising:
computer program code that monitors a magnitude of row-correlated noise generated by the digital X-ray detector during an idle state of the digital X-ray detector.

26. The computer usable medium of claim 20, wherein the threshold further comprises:
a threshold associated with an acquisition technique of the digital X-ray detector.

27. A computer usable medium including a program to analyze row-correlated noise from a digital X-ray detector, the program comprising:
computer program code that averages pixel values in each row of the digital X-ray detector;
computer program code that determines contrast from amplitude; and
computer program code that estimates electromagnetic interference from measurement data.

28. The computer usable medium of claim 27, wherein the computer program code that averages further comprises:
computer program code that divides an image into a plurality of regions of interest; and
computer program code that averages each of the regions of interest.

29. The computer usable medium of claim 27, wherein the computer program code that estimates further comprises:
computer program code that minimizes a nonlinear least squares criterion of the measurement data.

* * * * *